May 26, 1970 R. A. REZNICEK 3,513,655
SPRING CAGING DEVICE FOR MASTER CYLINDERS
Filed July 18, 1968 2 Sheets-Sheet 1
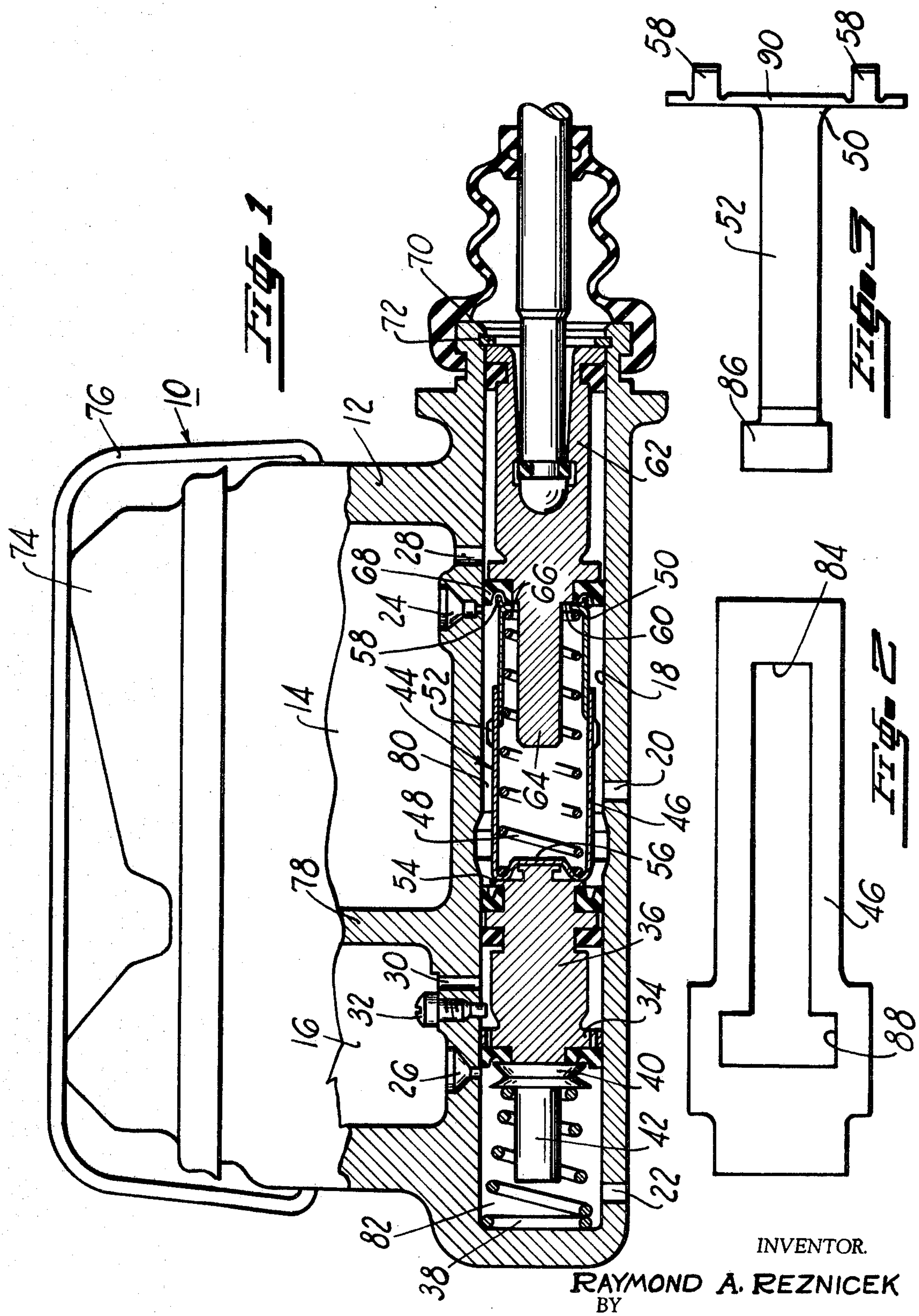
INVENTOR.
RAYMOND A. REZNICEK
BY
Richard G. Geib
ATTORNEY SPRING CAGING DEVICE FOR MASTER CYLINDERS
Filed July 18, 1968 2 Sheets-Sheet 2
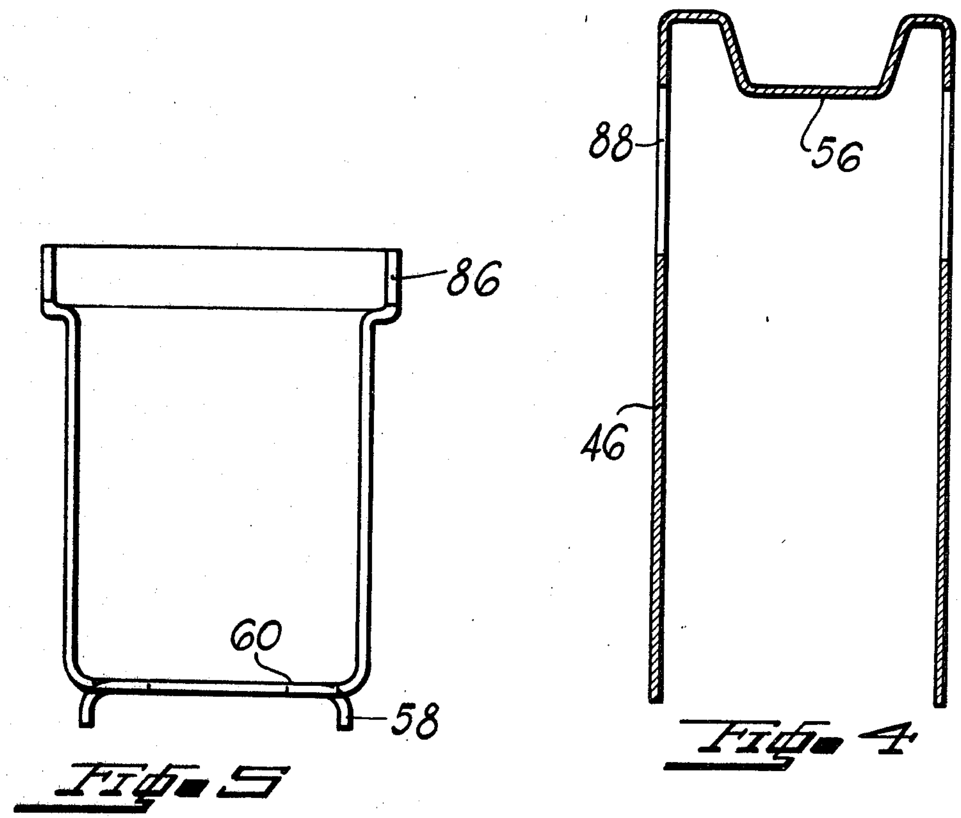
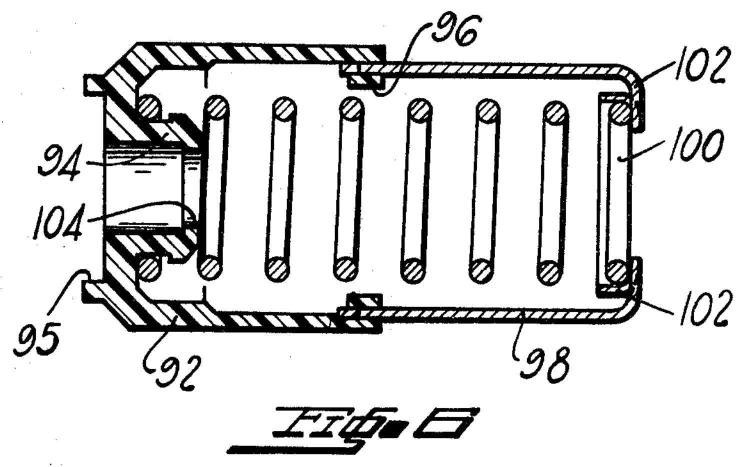
INVENTOR.
RAYMOND A. REZNICEK
BY
Richard G. Geib
ATTORNEY 3,513,655
SPRING CAGING DEVICE FOR MASTER CYLINDERS Raymond A. Reznicek, St. Joseph, Mich., assignor to The Bendix Corporation, a corporation of Delaware Filed July 18, 1968, Ser. No. 745,815
Int. Cl. F15b 7/00; B60t 17/10
U.S. Cl. 60—54.6 14 Claims

ABSTRACT OF THE DISCLOSURE

An improved caging device for operatively connecting primary and secondary pistons in a split master cylinder having two interlocking cup-shaped retainers which interlock by means of fingers on one of the containers which lock into slots or grooves in the other retainer.

SUMMARY

Prior art master cylinders involving cage spring connection between primary and secondary pistons, as seen in U.S. Patent No. 3,149,468, assigned to the common assignee of this application, utilize a top-hat retainer and a caging bolt for adjustably uniting the top-hat retainer with a spring between it and the primary piston. It has been observed that in the servicing of this prior art type of master cylinder that mechanics have adjusted the heights of the caging bolt and thereby changed the operating characteristics of the master cylinder. This invention has as a primary purpose the elimination of such problems in the fields by employing a caging assembly which is preset and not changeable in the field.

It is also a principal object of this invention to provide a caging mechanism which eliminates costly machining operation and assembly techniques that is attendant to prior art cage spring arrangements in master cylinders.

A more detailed object and advantage of this invention is the elimination of the assembly problems which are encountered when torquing the primary piston assembly to a predetermined dimension for the cage spring device by establishing a predetermined dimension of the components by simply utilizing the dimension of the components by simply utilizing the dimensions of the caging device components.

DRAWING DESCRIPTION

Other objects and advantages of this invention will appear to those skilled in the art from the following description of the drawings in which:

FIG. 1 is a partial cross sectional view of a split master cylinder employing a spring caging device in accordance with the principles of this invention;

FIG. 2 is a plan view of one of the components of the spring caging device between the primary and secondary pistons in FIG. 1;

FIG. 3 is a plan view of the other of these components of the spring caging device between the primary and secondary pistons in FIG. 1;

FIG. 4 is a side view of the component shown in plan view by FIG. 2;

FIG. 5 is a side view of the component shown in plan form by FIG. 3; and

FIG. 6 is a modified spring caging device in accordance with the principles of this invention shown in cross section.

DETAILED DESCRIPTION

With more particular reference to FIG. 1 there is shown a master cylinder 10 having a housing 12, which includes reservoir chambers 14 and 16 and a longitudinal bore 18 with spaced discharge ports 20 and 22. The housing is also provided with compensating ports 24 and 26 and filler ports 28 and 30 between the reservoirs 14 and 16 and the longitudinal bore 18. In addition, a tapped hole is provided for a stop bolt 32 in the reservoir chamber 16, which stop bolt has a depending projection emerging into the bore 18 in an area behind a flange 34 of secondary piston 36 within the bore 18 to limit the retracted or released position for the secondary piston 36. As seen, the secondary piston 36 is urged to its released position by means of a return spring 38 between the ends of the bore 18 and the piston 36.

In assembling the master cylinder, the spring 38 is inserted into the bore 18 and the secondary piston projection 42 is fitted within the spring coils to place the spring against a retainer 40. Next a spring caging device 44, having a cup-shaped slotted spring retainer 46 within which a spring 48 is located and confined by means of a similar cup-shaped retainer 50 having fingers 52 interlocked with the slots of the retainer 46 to confine the caged spring, is placed over the rearward projecting portion 54 of the secondary piston 36 such that portion 54 is within an inverted section 56 of the slotted cup-shaped retainer 46, which also serves to axially align the spring caging device 44 in the bore 18. The retainer 50 is provided with projecting ears 58 and an annular flange 60 thereunder. A primary piston 62 has a forward rod-like projection 64 inserted within the spring caging device 44 until shoulder 66 on the primary piston 62 abuts the flange 60 of the retainer 50. In this position the primary seal 68 of the piston 62 is retained at the face of piston 62 by the rearwardly projecting fingers 58 on the retainer 50. The primary piston 62 can now be pushed to be completely within the bore compressing the return spring 38 and a snap ring 70 is fitted into a groove 72 in the housing 12 to maintain the pistons 62 and 36 within the bore 18.

It should be noted at this time that the spring caging device 44 is provided with tolerances on the components which will in the interlocked attitude maintain the spring 48 under slight compression, and which will have a predetermined height that will enable the return spring 38 to maintain the released position for pistons 36 and 62 to be slightly behind the compensating ports 26 and 24, respectively. The master cylinder construction is then completed by joining a cap 74, as by a bail 76 to the housing 12 to close the reservoir chambers 14 and 16. It will, presumedly, be readily understood by those skilled in the art to which this invention relates that the cap 74 incorporates a flexible sealing member which cooperates, not only with the peripheral walls of the reservoirs 14 and 16, but with the partition 78, as well, to maintain the separateness of the reservoirs 14 and 16 whereby fluid pressure chambers 80 and 82 will have separated fluid supply and fluid pressure development.

With reference now to FIGS. 2 and 3, the basic components of the spring caging device are shown in plan form so that the reader may readily understand the manner of interlocking the retainers 46 and 50. Essentially, as seen in FIG. 2, the retainer 46 is provided with upper and lower T solts 84 and the retainer 50 has similar upper and lower fingers 52 with the raised wide area 86. Upon assembly, the retainer 50 is telescoped within the retainer 46 until the wide T head 86 is underneath the wide slot 88 of the retainer 50 whereupon it springs outwardly because of the resiliency in the fingers 52; and, upon release of the compressive force teelscoping retainer 46 and 50, the spring 48 will move the head 86 back on top of the retainer 46 to interlock the retainers with the spring 48 interposed. The seal positioners 58 are stamped ears in the plate 90 of the retainer 50. If desired, a trailing ring may be affixed, as by bonding in some manner, to the plate 90 to take the place of the seal positioning ears 58.

Similar blown up or enlarged details of the retainers 46 and 50 are shown in FIGS. 4 and 5.

With reference now to FIG. 6 there is shown a modified spring caging device employing a plastic cup-shaped retainer 92 having a boss 94 for receiving projection 64 of primary piston 62. The plastic retainer 92 is also formed with an annular ring 95 for positioning the primary seal 68 of the primary piston 62 when in the assembled attitude inside the bore 18 of the master cylinder 10. Furthermore, the plastic retainer is formed with downwardly projecting ears 96 that terminate in a wide area head, much as the head 86 on the fingers 52 of the retainer 50. A metal stamping, cup-shaped, retainer 98 having a T slot similar to the retainer 46 telescopes within the plastic retainer 92 with a spring 100 therebetween until the wide area portions of the projections 96 overlie the wide portion of the slot in the retainer 98 whereby they may pass therethrough and the retainer 92 may be permitted to move backwardly under the action of the spring 100 whereby the narrow portion of the slot in the retainer 98 slides along a necked portion of the depending projections 96 of the retainer 92 to interlock the two retainers together with the spring 100 caged therebetween. It should also be noted that the retainer 98 may be provided with spaced stamped ears 102 for locating the right end of the spring 100 within the retainer 98 and preventing it from moving outwardly to interfere with the interlocking features aforementioned. The boss 94 of the retainer 92 may be formed with a flange 104 which passes over the projection 64 such that a snap ring may be placed in the groove of the projection 64 whereby after the flange 104 passes over the snap ring the retainer 92 is locked to the projection 64. If desired, the left end of the spring 100 may be formed so as to put a compressive effect upon this boss to insure the locking of this retainer portion to the projection 64.

The dimension of the T slot is such that during normal operation of the master cylinder, the fingers 52 will not be permitted to move to a position whereby the wide area 86 underlies or overlies, in the case of FIG. 6, the wide area portion 88 of retainer 46 or that same portion of the retainer 98. In order to absolutely insure that such possibility of disengagement of the retainers 46 and 50, the projection 64 may be sized so as to abut on the inverted section 56 of the retainer 46 or upon the rearwardly projecting portion of the secondary piston 36 extending through the retainer 98 prior to the positioning of the head 86 under the slot 88 or the projections 96 under the slot in the retainer 98.

Having fully described an operative construction for my invention it is now desired to set forth the intended protection sought by these Letters Patent in the appended claims.

I claim:

1. In a master cylinder for a hydraulic braking system having a bore in the cylinder, two plungers in the bore, a first chamber between an end of one of the plungers and an end of the cylinder, a second chamber between adjacent ends of the two plnugers, an outlet port for each chamber, and means operatively interposed between said adjacent ends of said two plungers, said means comprising:

two relatively movable, axially aligned housing members provided with interengaging portions for determining the over-all length of said housing members when assembled to thereby provide a definite spaced relationship between said plungers; and spring means urging said members into interengagement.

2. In a master cylinder construction for a hydraulic braking system having a first plunger mounted in a cylinder bore, and defining therein a first chamber having an outlet port, and a second plunger ahead of the first plunger with the first chamber therebetween with a second chamber being defined by the second plunger and the end of the bore which second chamber also is provided with on outlet port, a device to render the first piston and second piston cooperative with one another, said device comprising:

a slotted spring retainer;

a spring within said slotted spring retainer bearing on same at one end of the spring;

a second retainer for the other end of the spring, said second retainer having finger means adapted to fit within slots of said slotted spring retainer and hold said spring in compression therebetween.

3. In a master cylinder construction for a hydraulic braking system having a first plunger mounted in a cylinder bore, and defining therein a first chamber having an outlet port, and a second plunger ahead of the first plunger with the first chamber therebetween with a second chamber being defined by the second plunger and the end of the bore which second chamber also is provided with an outlet port, a device to render the first piston and second piston cooperative with one another, said device comprising:

a slotted cup-shaped spring retainer;

a spring within said slotted spring retainer bearing on same at one end of the spring;

a second cup-shaped retainer for the other end of the spring, said second retainer having finger means adapted to fit within slots of said slotted spring retainer and hold said spring in compression therebetween.

4. In a master cylinder construction for a hydraulic braking system having a first plunger mounted in a cylinder bore, and defining therein a first chamber having an outlet port, and a second plunger ahead of the first plunger with the first chamber therebetween with a second chamber being defined by the second plunger and the end of the bore which second chamber also is provided with an outlet port, a device to render the first piston and second piston cooperative with one another, said device comprising:

a slotted cup-shaped plastic spring retainer;

a spring within said slotted spring retainer bearing on same at one end of the spring;

a second cup-shaped retainer for the other end of the spring, said second retainer having finger means adapted to fit within slots of said slotted spring retainer and hold said spring in compression therebetween.

5. The structure of claim 2 wherein said second spring retainer may be further characterized as having seal retainer provisions for a face seal of the first plunger.

6. The structure of claim 3 wherein said second spring retainer may be further characteried as having seal retainer provisions for a face seal of the first plunger.

7. The structure of claim 4 wherein said second spring retainer may be further characterized as having seal retainer provisions for a face seal of the first plunger.

8. The structure of claim 2 wherein said slotted spring retainer has a means to align said device with respect to the first plunger and the second plunger in the bore.

9. The structure of claim 3 wherein said slotted spring retainer has a means to align said device with respect to the first plunger and the second plunger in the bore.

10. The structure of claim 4 wherein said slotted spring retainer has a means to align said device with respect to the first plunger and the second plunger in the bore.

11. The structure of claim 5 wherein said slotted spring retainer has a means to align said device with respect to the first plunger and the second plunger in the bore.

12. The structure of claim 6 wherein said slotted spring retainer has a means to align said device with respect to the first plunger and the second plunger in the bore.

13. The structure of claim 7 wherein said slotted spring retainer has a means to align said device with respect to the first plunger and the second plunger in the bore.

14. A caging device for a spring connection between two pistons in a common bore, said caging device comprising:

a first retainer plate having slotted trailing sections, with the slot having a wider area adjacent the plate end which apruptly narrows and extends in such narrow form for a predetermined distance in the trailing sections;

a spring saving one end on the plate with a coil diameter that leaves a spare between the coils and the inner surfaces of the trailing sections;

a second retainer plate fitted on the other end of the spring said second plate having finger projections terminating in a locking end having a wide offset surface connected by a narrower neck portion to the finger projections which upon compression of said spring mates with said slots of said trailing section to interlock said first plate with said second plate with said spring under limited compression therebetween.

References Cited

UNITED STATES PATENTS

| | | | |
|---|---|---|---|
| 2,732,918 | 1/1956 | Hackworth | 60—5.6 |
| 3,149,468 | 9/1964 | Shutt | 60—5.6 |
| 3,310,944 | 3/1967 | Bauman | 60—5.6 |

MARTIN P. SCHWADRON, Primary Examiner

R. B. BUNEVICH, Assistant Examiner

U.S. Cl. X.R.

188—152